United States Patent
Saito et al.

(10) Patent No.: US 6,773,783 B2
(45) Date of Patent: Aug. 10, 2004

(54) MAGNETIC RECORDING MEDIUM IN THE FORM OF A DISC

(75) Inventors: Shinji Saito, Kanagawa (JP); Hitoshi Noguchi, Kanagawa (JP); Nobuo Yamazaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/384,669

(22) Filed: Mar. 11, 2003

(65) Prior Publication Data

US 2003/0175469 A1 Sep. 18, 2003

(30) Foreign Application Priority Data

Mar. 11, 2002 (JP) ..................... P.2002-065353

(51) Int. Cl.$^7$ ................................ G11B 5/82
(52) U.S. Cl. ............... 428/65.3; 428/141; 428/213; 428/480; 428/694 BR
(58) Field of Search ............... 428/65.3, 141, 428/213, 480, 694 BR

(56) References Cited

FOREIGN PATENT DOCUMENTS

| JP | 5-109061 A | 4/1993 |
|---|---|---|
| JP | 5-197946 A | 8/1993 |
| JP | 5-290354 A | 11/1993 |
| JP | 10-21529 A | 1/1998 |
| JP | 10-21530 A | 1/1998 |
| JP | 10-302243 | 11/1998 |
| JP | 2000-40218 | 2/2000 |

*Primary Examiner*—Stevan A. Resan
(74) *Attorney, Agent, or Firm*—Sughrue Mion, PLLC

(57) ABSTRACT

A magnetic recording medium in the form of a disc comprising a polyethylene naphthalate support having provided thereon a magnetic layer comprising ferromagnetic metal fine powder or ferromagnetic hexagonal ferrite fine powder dispersed in a binder, wherein the central plane average surface roughness of the magnetic layer of the magnetic recording medium is 5 nm or less, the thickness variation rate of the disc is 3% or less, and the total thickness of the disc X $\mu$m and the outside diameter of the disc Y mm satisfy the relationship of $0.3 \leq Y/X \leq 0.8$.

10 Claims, No Drawings

MAGNETIC RECORDING MEDIUM IN THE FORM OF A DISC

FIELD OF THE INVENTION

The present invention relates to a magnetic recording medium in the form of a disc having a magnetic layer containing ferromagnetic metal fine powder or hexagonal ferrite fine powder for high density recording.

BACKGROUND OF THE INVENTION

In the field of the magnetic disc, a 2 MB MF-2HD floppy disc using Co-modified iron oxide has been generally loaded in a personal computer. However, along with the rapid increase in the amount of data to be dealt with, the capacity of the disc has become insufficient and the increase of the capacity of the floppy disc has been demanded.

Magnetic recording media comprising a magnetic layer containing an iron oxide, a Co-modified iron oxide, $CrO_2$, ferromagnetic metal powder, or hexagonal ferrite powder dispersed in a binder coated on a nonmagnetic support have been conventionally widely used. Ferromagnetic metal fine powders and hexagonal ferrite fine powders have been known to have excellent high density recording characteristics among these.

As high capacity discs using ferromagnetic metal fine powders which are excellent in high density recording characteristics, there are 10 MB MF-2TD and 21 MB MF-2SD, and as high capacity discs using hexagonal ferrite, there are 4 MB MF-2ED and 21 MB Floptical, however, any of them is not satisfactory with respect to capacities and properties. As is the circumstance, various attempts have been made to improve high density recording characteristics.

On the other hand, a magnetic recording medium in the form of a disc comprising a thin magnetic layer and a functional nonmagnetic layer has been developed and floppy discs of the class with the capacity of 100 MB are now on the market. As floppy discs showing these characteristics, JP-A-5-109061 (the term "JP-A" as used herein means an "unexamined published Japanese patent application") proposes the constitution comprising a magnetic layer having Hc of 1,400 Oe or more and a thickness of 0.5 $\mu$m or less and a nonmagnetic layer containing electrically conductive particles, JP-A-5-197946 proposes the constitution containing an abrasive having a particle size larger than the thickness of the magnetic layer, and JP-A-5-290354 proposes the constitution comprising a magnetic layer having a thickness of 0.5 $\mu$m or less with the fluctuation of the thickness of the magnetic layer being within ±15%, in which the surface electric resistance is regulated. Further, JP-A-10-21529 discloses that stable head touch can be obtained by regulating the outside diameter of a disc and the thickness of a support by using aramid as the support, and JP-A-10-21530 by using polyethylene naphthalate as the support.

However, with the rapid trend of the increase of the density of magnetic recording media in the form of a disc, it has become difficult to obtain satisfactory characteristics even with these techniques. In particular, when reproduction is carried out with a high speed magneto-resistance head (an MR head) for high density not with a conventional electromagnetic induction type head, thermal asperities caused by the contact heat by disc and head occur frequently, further, the abrasion of the MR element increases, as a result, the output becomes unstable and sufficient performance cannot be obtained.

SUMMARY OF THE INVENTION

Accordingly, an object of the present invention is to provide a magnetic recording medium in the form of a disc which is markedly improved in electromagnetic characteristics, in particular, high density recording characteristics, and can exhibit the excellent characteristics in every size of a disc when reproduction is performed by an MR head, e.g., AMR, GMR and TMR.

As a result of eager investigation of the above object, the present inventors have found that the problems of conventional techniques can be overcome by satisfying the following constitution and physical properties.

That is, the present invention is as follows.

(1) A magnetic recording medium in the form of a disc comprising a polyethylene naphthalate support having provided thereon a magnetic layer comprising ferromagnetic metal fine powder or ferromagnetic hexagonal ferrite fine powder dispersed in a binder, wherein the central plane average surface roughness of the magnetic layer of the magnetic recording medium is 5 nm or less, the thickness variation rate of the disc is 3% or less, and the total thickness of the disc X $\mu$m and the outside diameter of the disc Y mm satisfy the relationship of $0.3 \leq Y/X \leq 0.8$.

Further preferred embodiments of the present invention are as follows.

(2) The magnetic recording medium in the form of a disc as described in the above item (1), wherein a substantially nonmagnetic subbing layer is provided between the support and the magnetic layer.

(3) The magnetic recording medium in the form of a disc as described in the above item (1) or (2), wherein the central plane average surface roughness of the magnetic layer is 3 nm or less.

(4) The magnetic recording medium in the form of a disc as described in the above item (1), (2) or (3), wherein reproduction is performed by a magneto-resistance head.

The magnetic recording medium according to the present invention is markedly improved in electromagnetic characteristics, in particular, high density recording characteristics, and can exhibit the excellent characteristics in every size of a disc when reproduction is carried out by an MR head, e.g., AMR, GMR and TMR, and in particular exhibits high density characteristics in reproduction by an MR head.

The reason for this fact is not clearly known but is presumed as follows.

In a conventional magnetic disc medium, a designing method has been taken so as to improve the head touch with a disc by thinning the thickness of the support of a disc to a certain degree to thereby reduce the rigidity of the disc and improve adhesion with the head. However, when the signal recorded on such a magnetic disc is reproduced with an MR head, thermal asperities are caused by heat generated by the contact of the head with minute protrusions on the surface of the disc due to too close adhesion of the head and disc.

Further, it is also thought that a disc which is low in rigidity is liable to wrap around a head part, so that the abrasion of the weak part of head, e.g., an MR element, is accelerated.

Furthermore, it has also been found that when a disc low in rigidity is subjected to high speed rotation (from 2,000 to 10,000 rpm), violent vertical motion is generated and the stable contact of the disc with a head cannot be maintained at all.

It is thought that the magnetic recording medium in the form of a disc (hereinafter also referred to as "the disc") of the present invention is highly rigid, so that excessive contact of the disc with a head can be obviated, as a result, the generation of thermal asperities and the partial abrasion of the head part can be inhibited. In addition, it is thought that since the disc of the invention is highly rigid, stable head touch can be achieved without increasing vertical motion of the disc at high speed rotation.

Further, it is presumed that by making the central plane average surface roughness of the magnetic layer surface 5 nm or less, the touch of the disc with a head is made uniform on a micro-level, so that stable head touch can be achieved even in such a highly rigid disc.

Furthermore, it is thought that vertical motion of the disc at rotation can be made small by making the thickness variation rate of the disc 3% or less, thus the contact state of the disc and head can be maintained constant even in such a highly rigid magnetic disc.

Still further, the reasons that the present invention exhibits excellent effect are presumably due to the facts that since polyethylene naphthalate is more rigid than polyethylene terephthalate, the vertical motion of the disc at high speed rotation is more stable, and that since polyethylene naphthalate has a high modulus of elasticity, the support itself is deformed with difficulty and more excellent in the flatness of disc.

DETAILED DESCRIPTION OF THE INVENTION

The magnetic recording medium according to the present invention is described in detail below.

The magnetic recording medium according to the present invention is a disc comprising a polyethylene naphthalate support having provided thereon a magnetic layer comprising ferromagnetic metal fine powder or ferromagnetic hexagonal ferrite fine powder dispersed in a binder. The magnetic recording medium can exhibit excellent high density characteristics which cannot be achieved by conventional techniques and can exhibit the excellent characteristics in every size of a disc by regulating the central plane average surface roughness of the magnetic layer to 5 nm or less and the thickness variation rate of the disc to 3% or less, and maintaining the relationship of $0.3 \leq Y/X \leq 0.8$ between the total thickness of the disc $X$ $\mu$m and the outside diameter of the disc $Y$ mm.

As described above, the disc in the present invention is a disc in which the total thickness of the disc $X$ $\mu$m and the outside diameter $Y$ mm satisfy the relationship of $0.3 \leq Y/X \leq 0.8$, preferably $0.4 \leq Y/X \leq 0.7$, and more preferably $0.5 \leq Y/X \leq 0.7$.

When $Y/X$ is greater than 0.8, the rigidity of the disc lowers and the effect of the invention cannot be obtained. When $Y/X$ is smaller than 0.3, the rigidity is too strong and it becomes difficult to lessen the impact of contact of the disc and a head even when there is a trace of undulation on the surface.

The central plane average surface roughness of the magnetic layer of the disc in the present invention is 5 nm or less, preferably 3 nm or less, and more preferably 2 nm or less.

The thickness variation rate of the disc is 3% or less, preferably ±1% or less, and more preferably 0.5% or less. When the variation rate is greater than 3%, the vertical motion of the disc becomes great, thus stable head touch cannot be obtained.

Further, when the disc is free of local distortion and curling is small, the vertical motion of the disc becomes small and is preferred.

When protrusions, in particular coarse protrusions having a height of 50 nm or higher, are less on the surface of the disc, the collision of the head with protrusions becomes less, which is preferred.

Although the effect of the present invention does not depend upon the diameter of the disc, the outside diameter Y is preferably from 20 to 150 mm, and the inside diameter is preferably from 2 to 30 mm. When the inside diameter is smaller than 2 mm, not only it is difficult to support the disc but the rigidity on the side of the inside periphery becomes too strong and good head touch becomes difficult to be taken. Further, when the inside diameter is greater than 30 mm, a recording area decreases, which is not preferred.

Ferromagnetic Metal Fine Powder

The ferromagnetic powders which can be used in the magnetic layer of the present invention are preferably ferromagnetic alloy powders containing $\alpha$-Fe as a main component. These ferromagnetic powders may contain, in addition to the prescribed atoms, the following atoms, e.g., Al, Si, S, Sc, Ca, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr and B. In particular, it is preferred to contain at least one of Al, Si, Ca, Y, Ba, La, Nd, Co, Ni and B, in addition to $\alpha$-Fe, and more preferably at least one of Co, Y and Al. The content of Co is preferably from 0 to 40 atomic %, more preferably from 15 to 35 atomic %, and most preferably from 20 to 35 atomic %, the content of Y is preferably from 1.5 to 12 atomic %, more preferably from 3 to 10 atomic %, and most preferably from 4 to 9 atomic %, the content of Al is preferably from 1.5 to 12 atomic %, more preferably from 3 to 10 atomic %, and most preferably from 4 to 9 atomic %, each based on Fe. These ferromagnetic powders may be treated in advance with the later described dispersant, lubricant, surfactant, and antistatic agent before dispersion.

The specific examples of ferromagnetic alloy powders are disclosed in JP-B-44-14090 (the term "JP-B" as used herein means an "examined Japanese patent publication"), JP-B-45-18372, JP-B-47-22062, JP-B-47-22513, JP-B-46-28466, JP-B-46-38755, JP-B-47-4286, JP-B-47-12422, JP-B-47-17284, JP-B-47-18509, JP-B-47-18573, JP-B-39-10307, JP-B-46-39639, U.S. Pat. Nos. 3,026,215, 3,031,341, 3,100, 194, 3,242,005, and 3,389,014.

Ferromagnetic alloy fine powders may contain a small amount of a hydroxide or an oxide. Ferromagnetic alloy fine powders can be prepared by well-known processes, such as a method of reducing a composite organic acid salt (mainly an oxalate) with a reducing gas, e.g., hydrogen; a method of reducing an iron oxide with a reducing gas, e.g., hydrogen, to obtain Fe or Fe—Co particles; a method of pyrolysis of a metal carbonyl compound; a method of adding to an aqueous solution of ferromagnetic metal a reducing agent, e.g., sodium borohydride, hypophosphite or hydrazine, to effect reduction; and a method of evaporating a metal in a low pressure inert gas to obtain fine powder. The thus-obtained ferromagnetic alloy powders may be subjected to well-known gradual oxidization treatment, e.g., a method of immersing powders in an organic solvent and then drying; a method of immersing powders in an organic solvent, charging an oxygen-containing gas to form oxide films on the surfaces of the powders and then drying; and a method of forming oxide films on the surfaces of powders by regulating partial pressure of an oxygen gas and an inert gas without using an organic solvent.

The ferromagnetic powders for use in the magnetic layer in the present invention have a specific surface area ($S_{BET}$) as measured by the BET method of generally from 40 to 80 m²/g, preferably from 45 to 80 m²/g, and more preferably from 50 to 70 m²/g. When $S_{BET}$ is less than 40 m²/g, noise increases and when it is more than 80 m²/g, good surface property is obtained with difficulty, which is not preferred.

The ferromagnetic powders for use in the magnetic layer in the present invention have a crystallite size of generally from 80 to 350 Å, preferably from 100 to 250 Å, and more preferably from 140 to 200 Å. The length of the long axis of the ferromagnetic powders is generally from 0.02 to 0.25 μm, preferably from 0.03 to 0.15 μm, and more preferably from 0.04 to 0.08 μm. The ferromagnetic powders preferably have an acicular ratio of from 3 to 15, more preferably from 5 to 12.

The ferromagnetic metal powders have a saturation magnetization ($\sigma_s$) of generally from 90 to 180 A·m²/kg (emu/g), preferably from 100 to 150 A·m²/kg (emu/g), and more preferably from 110 to 130 A·m²/kg (emu/g).

The ferromagnetic metal powders preferably have a water content of from 0.01 to 2% by weight. The water content of the ferromagnetic metal powders is preferably optimized by selecting the kinds of binders.

The pH of the ferromagnetic powders is preferably optimized by the combination with the binder to be used. The pH range is generally from 4 to 12, preferably from 6 to 10. The ferromagnetic powders may be surface-treated with Al, Si, P or oxides thereof, if necessary, and the amount thereof is from 0.1 to 10% by weight based on the ferromagnetic powders. When the ferromagnetic powders are subjected to the surface treatment, the adsorption of a lubricant, e.g., fatty acid, becomes 100 mg/m² or less, which is, therefore, preferred. Soluble inorganic ions (e.g., Na, Ca, Fe, Ni and Sr) are sometimes contained in the ferromagnetic powders. It is preferred substantially not to contain such soluble inorganic ions but the properties of the ferromagnetic powders are not particularly affected if the content is 200 ppm or less. The ferromagnetic metal powders for use in the present invention preferably have less voids and the value thereof is 20% by volume or less, more preferably 5% by volume or less. The figure of the ferromagnetic powders is not particularly limited, and any figure such as an acicular, ellipsoidal or spindle figure may be used so long as it satisfies the above-described properties as to particle sizes. SFD (switching field distribution) of the ferromagnetic powder itself is preferably small, preferably 0.8 or less. When the SFD is 0.8 or less, electromagnetic characteristics are excellent, high output can be obtained, reversal of magnetization becomes sharp and peak shift is less, and suitable for high density digital magnetic recording.

It is necessary to make the distribution of the coercive force Hc of the ferromagnetic powders small. For achieving small Hc distribution, means of making particle size distribution of goethite in the ferromagnetic powders good and preventing sintering are effective.

Hexagonal Ferrite Fine Powder

The examples of hexagonal ferrite powders which can be used in the present invention include substitution products of barium ferrite, strontium ferrite, lead ferrite and calcium ferrite and Co substitution products. Specifically, magnetoplumbite type barium ferrite and strontium ferrite, magnetoplumbite type ferrite having covered the particle surfaces with spinel, and magnetoplumbite type barium ferrite and strontium ferrite partially containing spinel phase are exemplified. The hexagonal ferrite powders may contain, in addition to the prescribed atoms, the following atoms, e.g., Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge and Nb. In general, hexagonal ferrite powders containing the following elements can be used, e.g., Co—Ti, Co—Ti—Zr, Co—Ti—Zn, Ni—Ti—Zn, Nb—Zn—Co, Sb—Zn—Co and Nb—Zn. According to starting materials and producing processes, specific impurities may be contained.

The particle size of hexagonal ferrite powders is generally from 10 to 200 nm as a hexagonal tabular diameter, and preferably from 20 to 100 nm. When reproduction is performed by using an MR head, it is necessary to reduce noise, accordingly the tabular diameter is preferably 40 nm or less, but when it is smaller than 10 nm, stable magnetization cannot be obtained due to thermal fluctuation. On the other hand, when the particle size is greater than 200 nm, noise increases, therefore, both of such particle diameters are not suitable for high density magnetic recording.

The tabular ratio (tabular diameter/tabular thickness) of hexagonal ferrite powders is preferably from 1 to 15, more preferably from 2 to 7. When the tabular ratio is small than 1, the packing density in a magnetic layer becomes high, which is preferred but satisfactory orientation cannot be obtained. When the tabular ratio is higher than 15, noise increases due to stacking among particles. The specific surface area ($S_{BET}$) measured by the BET method of the particles having diameters within this range is generally from 10 to 200 m²/g. The specific surface area nearly coincides with the value obtained by arithmetic operations from a tabular diameter and a tabular thickness. Hexagonal ferrite powders have a crystallite size of generally from 50 to 450 Å, and preferably from 100 to 350 Å.

The distribution of tabular diameter•tabular thickness is generally preferably as narrow as possible. It is difficult to show specific surface area distributions in numerical values but distributions can be compared by measuring TEM photographs of 500 particles selected randomly. The distributions are in many cases not regular distributions, but when expressed by the standard deviation to the average size from calculation, σ/average size is from 0.1 to 2.0. For obtaining narrow particle size distribution, it is efficient to make a particle-forming reaction system homogeneous as far as possible, and particles formed are subjected to distribution-improving treatment as well.

For example, a method of selectively dissolving ultrafine particles in an acid solution is also known. Coercive force (Hc) measured in magnetic powders of generally from 500 to 5,000 Oe (from 39.8 to 398 kA/m) or so can be produced. Higher Hc is advantageous for high density recording but Hc is restricted by capacities of recording heads. Hc of the magnetic powders according to the present invention is generally from 800 to 4,000 Oe (from 63.7 to 318 kA/m) or so, preferably from 1,500 to 3,500 Oe (from 117 to 279 kA/m). When saturation magnetization of heads is more than 1.4 tesla, Hc is preferably 2,000 Oe or more.

Hc can be controlled by particle sizes (tabular diameter•tabular thickness), the kinds and amounts of the elements contained, the substitution sites of the elements, and the reaction conditions of particle formation. Saturation magnetization ($\sigma_s$) is from 40 to 80 emu/g (A·m²/kg). $\sigma_s$ is preferably higher but it has inclination of becoming smaller as particles become finer. For improving $\sigma_s$, it is well known to make composite of magneto plumbite ferrite with spinel ferrite, to select kinds and amounts of elements to be contained, or to use W type hexagonal ferrite.

When magnetic powders are dispersed, particle surfaces of magnetic powders may also be treated with substances compatible with the dispersion media and polymers. Inorganic and organic compounds are used as the surface treating agents. For example, oxides or hydroxides of Si, Al and P, various kinds of silane coupling agents, and various kinds of titanium coupling agents are representative examples of the surface treating agents. The amount of these surface treating agents is from 0.1 to 10% by weight based on the amount of the magnetic powder.

The pH of magnetic powders is also important for dispersion, and the pH is in general from 4 to 12 or so. The optimal value is dependent upon the dispersion medium and the polymer. Taking the chemical stability and the storage stability of the media into consideration, pH of from 6 to 10 or so is selected. The water content in magnetic powder also affects dispersion. The optimal value is dependent upon the dispersion medium and the polymer, and the water content of from 0.01 to 2.0% by weight is selected in general.

Producing methods of hexagonal ferrite include the following methods and any of these methods can be used in the present invention:

(1) A glass crystallization method in which metal oxides which substitute barium oxide, iron oxide and iron, and boron oxide and the like as a glass forming material are mixed so as to make a desired ferrite composition, melted, and then suddenly cooled to obtain an amorphous product, the obtained product is reheating-treated, washed and then pulverized to obtain barium ferrite crystal powder;

(2) A hydrothermal reaction method in which a solution of metal salt of barium ferrite composition is neutralized with an alkali, byproducts are removed, followed by liquid phase heating at 100° C. or more, washing, drying and then pulverization to obtain barium ferrite crystal powder; and (3) A coprecipitation method in which a solution of metal salt of barium ferrite composition is neutralized with an alkali, byproducts are removed, followed by drying, treatment at 1,100° C. or less, and then pulverization to obtain barium ferrite crystal powder.

Nonmagnetic Layer

In the present invention, it is preferred to provide a subbing layer comprising nonmagnetic inorganic powder between a support and a magnetic layer as a lower coating layer.

The inorganic powder for use in the lower coating layer is nonmagnetic powder, which can be selected from inorganic compounds, e.g., metallic oxide, metallic carbonate, metallic sulfate, metallic nitride, metallic carbide and metallic sulfide. The examples of the inorganic compounds are selected from the following compounds and they can be used alone or in combination, e.g., alpha-alumina having an alpha-conversion rate of 90% or more, beta-alumina, gamma-alumina, theta-alumina, silicon carbide, chromium oxide, cerium oxide, alpha-iron oxide, goethite, corundum, silicon nitride, titanium carbide, titanium oxide, silicon dioxide, tin oxide, magnesium oxide, tungsten oxide, zirconium oxide, boron nitride, zinc oxide, calcium carbonate, calcium sulfate, barium sulfate, and molybdenum disulfide. Of these compounds, titanium dioxide, zinc oxide, iron oxide and barium sulfate are particularly preferred because they have small particle size distribution and various means for imparting functions, and titanium dioxide and alpha-iron oxide are more preferred.

These nonmagnetic powders preferably have a particle size of from 0.005 to 2 $\mu$m. If necessary, a plurality of nonmagnetic powders each having a different particle size may be combined, or single nonmagnetic powder having a broad particle size distribution may be used so as to attain the same effect as such a combination. A particularly preferred particle size of nonmagnetic powders is from 0.01 to 0.2 $\mu$m. In particular, when nonmagnetic powders are granular metallic oxides, the average particle size is preferably 0.08 $\mu$m or less, and when nonmagnetic powders are acicular metallic oxides, the long axis is preferably 0.3 $\mu$m or less. The nonmagnetic powders for use in the present invention have a tap density of from 0.05 to 2 g/ml, and preferably from 0.2 to 1.5 g/ml; and a water content of generally from 0.1 to 5% by weight, preferably from 0.2 to 3% by weight, and more preferably from 0.3 to 1.5% by weight.

The nonmagnetic powders have a pH value of generally from 2 to 11, and particularly preferably from 5.5 and 10; a specific surface area ($S_{BET}$) of generally from 1 to 100 m$^2$/g, preferably from 5 to 80 m$^2$/g, and more preferably from 10 to 70 m$^2$/g; and a crystallite size of preferably from 0.004 to 1 $\mu$m, and more preferably from 0.04 to 0.1 $\mu$m.

The nonmagnetic powders have an oil absorption amount using DBP (dibutyl phthalate) of generally from 5 to 100 ml/100 g, preferably from 10 to 80 ml/100 g, and more preferably from 20 to 60 ml/100 g; and a specific gravity of generally from 1 to 12, and preferably from 3 to 6. The figure of the nonmagnetic powders maybe any of acicular, spherical, polyhedral and tabular figures. The nonmagnetic powders preferably have a Mohs' hardness of from 4 to 10. The SA (stearic acid) adsorption amount of the nonmagnetic powders is from 1 to 20 $\mu$mol/m$^2$, preferably from 2 to 15 $\mu$mol/m$^2$, and more preferably from 3 to 8 $\mu$mol/m$^2$. The pH value of the nonmagnetic powders is preferably between 3 and 6.

The surfaces of these nonmagnetic powders are preferably covered with $Al_2O_3$, $SiO_2$, $TiO_2$, $ZrO_2$, $SnO_2$, $Sb_2O_3$, ZnO or $Y_2O_3$. $Al_2O_3$, $SiO_2$, $TiO_2$ and $ZrO_2$ are preferred in particular in the point of dispersibility, and $Al_2O_3$, $SiO_2$ and $ZrO_2$ are more preferred. These surface-covering agents can be used in combination or may be used alone.

A surface-treated layer treated by coprecipitation may be used according to the purpose, alternatively, surface treatment of particles may be previously performed to be covered with alumina in the first place, then the alumina-covered surface may be covered with silica, or vice versa.

A surface-covered layer may be porous, if necessary, but a homogeneous and dense surface is generally preferred. The surface treatment amount should of course be optimized by the binders and dispersing conditions to be used.

The specific examples of the nonmagnetic powders for use in the lower coating layer according to the present invention include Nanotite (manufactured by Showa Denko Co., Ltd.), HIT-100 and ZA-G1 (manufactured by Sumitomo Chemical Co., Ltd.), alpha-hematite DPN-250, DPN-250BX, DPN-245, DPN-270BX, DBN-SA1 and DBN-SA3 (manufactured by Toda Kogyo Co., Ltd.), titanium oxide TTO-51B, TTO-55A, TTO-55B, TTO-55C, TTO-55S, TTO-55D, SN-100, alpha-hematite E270, E271, E300 and E303 (manufactured by Ishihara Sangyo Kaisha Ltd.), titanium oxide STT-4D, STT-30D, STT-30, STT-65C, and alpha-hematite alpha-40 (manufactured by Titan Kogyo Co., Ltd.), MT-100S, MT-100T, MT-150W, MT-500B, MT-600B, MT-100F and MT-500HD (manufactured by Teika Co., Ltd.), FINEX-25, BF-1, BF-10, BF-20 and ST-M (manufactured by Sakai Chemical Industry Co., Ltd.), DEFIC-Y and DEFIC-R (manufactured by Dowa Mining Co., Ltd.), AS2BM and $TiO_2$ P25 (manufactured by Nippon Aerosil Co., Ltd.), and 100A, 500A and calcined products thereof (manufactured by Ube Industries, Ltd.). Particularly preferred nonmagnetic powders are titanium dioxide and alpha-iron oxide.

By the incorporation of carbon blacks into the lower coating layer, a desired micro Vickers' hardness can be obtained in addition to the well-known effects of reducing surface electrical resistance (Rs) and light transmittance. Further, it is also possible to obtain the effect of stocking a lubricant by the incorporation of carbon blacks into the lower layer. Furnace blacks for rubbers, thermal blacks for rubbers, carbon blacks for coloring and acetylene blacks can be used. Carbon blacks used in the lower layer should optimize the following characteristics by the desired effects and sometimes more effects can be obtained by the combined use.

The carbon blacks which can be used in the lower layer in the present invention have a specific surface area ($S_{BET}$) of generally from 100 to 500 $m^2$/g, and preferably from 150 to 400 $m^2$/g, a DBP oil absorption amount of generally from 20 to 400 ml/100 g, and preferably from 30 to 200 ml/100 g, an average particle size of generally from 5 to 80 m$\mu$ (nm), preferably from 10 to 50 m$\mu$ (nm), and more preferably from 10 to 40 m$\mu$ (nm), pH of from 2 to 10, a water content of from 0.1 to 10%, and a tap density of from 0.1 to 1 g/ml.

The specific examples of the carbon blacks for use in the lower coating layer in the present invention include BLACKPEARLS 2000, 1300, 1000, 900, 800, 880 and 700, and VULCAN XC-72 (manufactured by Cabot Co., Ltd.), #3050B, #3150B, #3250B, #3750B, #3950B, #950, #650B, #970B, #850B, MA-600, MA-230, #4000 and #4010 (manufactured by Mitsubishi Kasei Corp.), CONDUCTEX SC, RAVEN 8800, 8000, 7000, 5750, 5250, 3500, 2100, 2000, 1800, 1500, 1255 and 1250 (manufactured by Columbia Carbon Co., Ltd.), and Ketjen Black EC (manufactured by Akzo Co., Ltd.).

Carbon blacks for use in the present invention may be in advance surface-treated with a dispersant, may be grafted with a resin, or a part of the surface may be graphitized before use. The carbon black may be previously dispersed in a binder before addition to a coating solution. These carbon blacks can be used within the range not exceeding 50% by weight based on the above inorganic powders and not exceeding 40% by weight based on the total weight of the nonmagnetic layer. These carbon blacks can be used alone or in combination. Regarding the carbon blacks which can be used in the present invention, for example, *Carbon Black Binran* (*Handbook of Carbon Blacks*) (edited by the Carbon Black Association) can be referred to.

Organic powders can be used in the lower coating layer according to the purpose. The examples of such organic powders include acrylic styrene resin powders, benzoguanamine resin powders, melamine resin powders, and phthalocyanine pigments. In addition, polyolefin resin powders, polyester resin powders, polyamide resin powders, polyimide resin powders and polyethylene fluoride resin powders can also be used. The producing methods of these powders are disclosed in JP-A-62-18564 and JP-A-60-255827.

The binder resins, lubricants, dispersants, additives, solvents, dispersing methods and the like used in the magnetic layer shown below can be used in the lower coating layer in the present invention. In particular, with respect to the amounts and the kinds of the binder resins, and the addition amounts and the kinds of the additives and the dispersants, well-known techniques regarding the magnetic layer can be applied to the lower coating layer in the present invention.

The binders, lubricants, dispersants, additives, solvents, dispersing methods and the like so far been used in the magnetic layer can be used in the magnetic layer and the nonmagnetic layer in the present invention. In particular, with respect to the amounts and the kinds of the binders, and the addition amounts and the kinds of the additives and the dispersants, well-known techniques regarding the magnetic layer can be applied to the magnetic layer and the nonmagnetic layer in the present invention.

Conventionally well-known thermoplastic resins, thermosetting resins, reactive resins and mixtures of these resins are used as a binder in the present invention.

Thermoplastic resins having a glass transition temperature of from −100 to 150° C., a number average molecular weight of generally from 1,000 to 200,000, preferably from 10,000 to 100,000, and a polymerization degree of from about 50 to about 1,000 can be used in the present invention. The examples of such resins include polymers or copolymers containing the following compounds as the constituting units, e.g., vinyl chloride, vinyl acetate, vinyl alcohol, maleic acid, acrylic acid, acrylic ester, vinylidene chloride, acrylonitrile, methacrylic acid, methacrylic ester, styrene, butadiene, ethylene, vinyl butyral, vinyl acetal and vinyl ether; polyurethane resins and various rubber resins.

The examples of thermosetting resins and reactive resins which can be used in the present invention include phenol resins, epoxy resins, curable type polyurethane resins, urea resins, melamine resins, alkyd resins, acrylic reactive resins, formaldehyde resins, silicone resins, epoxy-polyamide resins, the mixtures of polyester resins and isocyanate prepolymers, the mixtures of polyesterpolyol and polyisocyanate, and the mixtures of polyurethane and polyisocyanate.

These resins are described in detail in *Plastic Handbook*, published by Asakura Shoten. It is also possible to use well-known electron beam-curable resins in each layer. The examples of these resins and producing methods are disclosed in detail in JP-A-62-256219. These resins can be used alone or in combination. The examples of preferred combinations include combinations of at least one selected from vinyl chloride resins, vinyl chloride-vinyl acetate copolymers, vinyl chloride-vinyl acetate-vinyl alcohol copolymers, and vinyl chloride-vinyl acetate-maleic anhydride copolymers with polyurethane resins, or combinations of these resins with polyisocyanate.

Polyurethane resins having well-known structures, e.g., polyester polyurethane, polyether polyurethane, polyether polyester polyurethane, polycarbonate polyurethane, polyester polycarbonate polyurethane and polycaprolactone polyurethane, can be used. Concerning every binder shown above, it is preferred that at least one polar group selected from the following groups is introduced by copolymerization or addition reaction for the purpose of obtaining further excellent dispersibility and durability, e.g., COOM, $SO_2M$, $OSO_2M$, P=$O(OM)_2$, O—P=$O(OM)_2$ (wherein M represents a hydrogen atom, or an alkali metal salt group), OH, $NR^2$, $N^+R^2$ (wherein R represents a hydrocarbon group), an epoxy group, SH and CN. The content of these polar groups is from $10^{-1}$ to $10^{-8}$ mol/g, and preferably from $10^{-2}$ to $10^{-6}$ mol/g.

The specific examples of binders for use in the present invention include VAGH, VYHH, VMCH, VAGF, VAGD, VROH, VYES, VYNC, VMCC, XYHL, YXSG, PKHH, PKHJ, PKHC and PKFE (manufactured by Union Carbide Co., Ltd.), MPR-TA, MPR-TA5, MPR-TAL, MPR-TSN, MPR-TMF, MPR-TS, MPR-TM and MPR-TAO (manufactured by Nisshin Chemical Industry Co., Ltd.), 1000W, DX80, DX81, DX82, DX83 and 100FD (manufactured by Electro Chemical Industry Co., Ltd.), MR-104, MR-105, MR-110, MR-100, MR-555 and 400X-110A (manufactured by Nippon Zeon Co., Ltd.), Nippollan N2301, N2302 and N2304 (manufactured by Nippon Polyurethane Co., Ltd.), Pandex T-5105, T-R3080, T-5201, Burnock D-400, D-210-80, Crisvon 6109 and 7209 (manufactured by Dainippon Chemicals and Ink. Co., Ltd.), Vylon UR8200, UR8300, UR8700, RV530 and RV280 (manufactured by Toyobo Co., Ltd.), Daipheramine 4020, 5020, 5100, 5300, 9020, 9022 and 7020 (manufactured by Dainichi Seika K.K.), MX5004 (manufactured by Mitsubishi Kasei Corp.), Sunprene SP-150 (manufactured by Sanyo Chemical Industries Co. Ltd.), and Salan F310 and F210 (manufactured by Asahi Chemical Industry Co., Ltd.).

The amount of a binder for use in the nonmagnetic layer and the magnetic layer of the present invention is from 5 to 50% by weight based on the amount of the nonmagnetic powder or the magnetic powder, and preferably from 10 to 30% by weight. When vinyl chloride resins are used as a binder, the amount of the binder is from 5 to 30% by weight, when polyurethane resins are used, the amount is from 2 to 20% by weight, and also it is preferred that polyisocyanate is used in an amount of from 2 to 20% by weight in combination with these binders. However, for instance, when head corrosion is caused by a slight amount of chlorine due to dechlorination, it is also possible to use polyurethane alone or a combination of polyurethane and isocyanate alone. When polyurethane is used in the present invention, it is preferred that the polyurethane has a glass transition temperature of from −50 to 150° C., and preferably from 0 to 100° C., breaking extension of from 100 to 2,000%, breaking stress of from 0.05 to 10 kg/mm$^2$ (from 0.49 to 98 N/m$^2$), and a yielding point of from 0.05 to 10 kg/mm$^2$ (from 0.49 to 98 N/m$^2$).

The amount of a binder, the amounts of vinyl chloride resin, polyurethane resin, polyisocyanate or other resins contained in the binder, the molecular weight of each resin constituting the magnetic layer, the amount of a polar group, or the above-described physical properties of resins can of course be varied in a nonmagnetic layer and a magnetic layer, according to necessity. These factors should be rather optimized in respective layers. Well-known techniques with respect to the multilayer magnetic layer can be used in the present invention. For example, when the amount of a binder in each layer is varied, it is effective to increase the amount of a binder contained in the magnetic layer to decrease scratches on the surface of the magnetic layer. For improving head touch against a head, it is effective to increase the amount of a binder in the nonmagnetic layer to impart flexibility.

The examples of polyisocyanates for use in the present invention include isocyanates, e.g., tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, and triphenylmethane triisocyanate; reaction products of these isocyanates with polyalcohols; and polyisocyanates formed by condensation reaction of isocyanates. These polyisocyanates are commercially available under the trade names of Coronate L, Coronate HL, Coronate 2030, Coronate 2031, Millionate MR and Millionate MTL (manufactured by Nippon Polyurethane Co., Ltd.), Takenate D-102, Takenate D-110N, Takenate D-200 and Takenate D-202 (manufactured by Takeda Chemical Industries, Ltd.), and Desmodur L, Desmodur IL, Desmodur N and Desmodur HL (manufactured by Sumitomo Bayer Co., Ltd.). These polyisocyanates may be used alone, or in combinations of two or more taking the advantage of a difference in curing reactivity in each layer.

Carbon Black, Abrasive

The examples of carbon blacks for use in the magnetic layer of the present invention include furnace blacks for rubbers, thermal blacks for rubbers, carbon blacks for coloring and acetylene blacks. These carbon blacks preferably have a specific surface area ($S_{BET}$) of from 5 to 500 m$^2$/g, a DBP oil absorption amount of from 10 to 400 ml/100 g, a particle size of from 5 to 300 m$\mu$, pH of from 2 to 10, a water content of from 0.1 to 10% by weight, and a tap density of from 0.1 to 1 g/ml. The specific examples of carbon blacks for use in the magnetic layer of the present invention include BLACKPEARLS 2000, 1300, 1000, 900, 905, 800 and 700 and VULCAN XC-72 (manufactured by Cabot Co., Ltd.), #80, #60, #55, #50 and #35 (manufactured by Asahi Carbon Co., Ltd.), #2400B, #2300, #900, #1000, #30, #40 and #10B (manufactured by Mitsubishi Kasei Corp.), CONDUCTEX SC, RAVEN 150, 50, 40 and 15, and RAVEN-MT-P (manufactured by Columbia Carbon Co., Ltd.), and Ketjen Black EC (manufactured by Akzo Co., Ltd.). Carbon blacks for use in the present invention may be in advance surface-treated with a dispersant, may be grafted with a resin, or a part of the surface may be graphitized before use. Carbon blacks may be previously dispersed in a binder before being added to a magnetic coating solution. These carbon blacks may be used alone or in combination. Carbon blacks are preferably used in an amount of from 0.1 to 30% based on the amount of the magnetic powder.

Carbon blacks can serve various functions such as preventing the static charge of a magnetic layer, reducing the friction coefficient, imparting a light-shielding property and improving film strength. Such functions vary depending upon the kind of the carbon black to be used. Accordingly, it is of course possible in the invention to select and determine the kinds, amounts and combinations of the carbon blacks to be added to the upper magnetic layer and the lower nonmagnetic layer, on the basis of the above-described various properties such as the particle size, the oil absorption amount, the electroconductivity and the pH value, or these should be rather optimized in each layer. Regarding carbon blacks which can be used in the magnetic layer of the present invention, e.g., *Carbon Black Binran (Handbook of Carbon Blacks)*, edited by the Carbon Black Association, can be referred to.

As abrasives which are used in the present invention, well-known materials essentially having a Mohs' hardness of 6 or more maybe used alone or in combination, e.g., alpha-alumina having an alpha-conversion rate of 90% or more, beta-alumina, silicon carbide, chromiumoxide, ceriumoxide, alpha-iron oxide, corundum, artificial diamond, silicon nitride, silicon carbide, titanium carbide, titanium oxide, silicon dioxide, and boron nitride. Composites composed of these abrasives (abrasives obtained by surface-treating with other abrasives) may also be used. Compounds or elements other than the main component are often contained in these abrasives, but the intended effect can be achieved so long as the content of the main component is 90% by weight or more.

These abrasives preferably have a particle size of from 0.01 to 2 $\mu$m. In particular, for improving electromagnetic characteristics, abrasives having narrow particle size distribution are preferably used.

For improving durability, a plurality of abrasives each having a different particle size may be combined according to necessity, or a single abrasive having a broad particle size distribution may be used so as to attain the same effect as such a combination. Abrasives for use in the present invention preferably have a tap density of from 0.3 to 2 g/ml, a water content of from 0.1 to 5% by weight, a pH value of from 2 to 11, and a specific surface area ($S_{BET}$) of from 1 to 30 m$^2$/g.

The figure of the abrasives for use in the present invention may be any of acicular, spherical and die-like figures. Abrasives having a figure partly with edges are preferred, because a high abrasive property can be obtained. The specific examples of abrasives for use in the present invention include AKP-12, AKP-15, AKP-20, AKP-30, AKP-50, HIT-20, HIT-30, HIT-55, HIT-60, HIT-70, HIT-80 and HIT-100 (manufactured by Sumitomo Chemical Co., Ltd.), ERC-DBM, HP-DBM and HPS-DBM (manufactured by Reynolds International Inc.), WA10000 (manufactured by Fujimi Kenmazai K.K.), UB20 (manufactured by Uemura Kogyo K.K.), G-5, Chromex U2 and Chromex U1 (manufactured by Nippon Chemical Industrial Co., Ltd.), TF100 and TF140 (manufactured by Toda Kogyo Co., Ltd.), beta-Random Ultrafine (manufactured by Ividen Co., Ltd.), and B-3 (manufactured by Showa Mining Co., Ltd.). These abrasives may be added to a nonmagnetic layer, if necessary. By adding abrasives into a nonmagnetic layer, it is possible to control the surface configuration or prevent abrasives from protruding. The particle sizes and the amounts of these abrasives to be added to a magnetic layer and a nonmagnetic layer should be selected at optimal values.

Additive

As the additives which are used in a magnetic layer and a nonmagnetic layer in the present invention, additives having a lubricating effect, an antistatic effect, a dispersing effect and a plasticizing effect are used. The examples of additives which can be used in the present invention include molybdenum disulfide, tungsten disulfide, graphite, boron nitride, graphite fluoride, silicone oils, polar group-containing silicones, fatty acid-modified silicones, fluorine-containing silicones, fluorine-containing alcohols, fluorine-containing esters, polyolefins, polyglycols, alkyl phosphates and alkali metal salts thereof, alkyl sulfates and alkali metal salts thereof, polyphenyl ethers, phenylphosphonic acids, aminoquinones, various kinds of silane coupling agents, titanium coupling agents, fluorine-containing alkyl sulfates and alkali metal salts thereof, monobasic fatty acids having from 10 to 24 carbon atoms (which may contain an unsaturated bond or which may be branched) and metal salts thereof (e.g., with Li, Na, K or Cu), mono-, di-, tri-, tetra-, penta- or hexa-alcohols having from 12 to 22 carbon atoms (which may contain an unsaturated bond or may be branched), alkoxy alcohols having from 12 to 22 carbon atoms, mono-fatty acid esters, di-fatty acid esters or tri-fatty acid esters comprising a monobasic fatty acid having from 10 to 24 carbon atoms (which may contain an unsaturated bond or may be branched) and any one of mono-, di-, tri-, tetra-, penta- and hexa-alcohols having from 2 to 12 carbon atoms (which may contain an unsaturated bond or may be branched), fatty acid esters of monoalkyl ethers of alkylene oxide polymerization products, fatty acid amides having from 8 to 22 carbon atoms, and aliphatic amines having from 8 to 22 carbon atoms.

The specific examples of fatty acids as additives include capric acid, caprylic acid, lauric acid, myristic acid, palmitic acid, stearic acid, behenic acid, oleic acid, elaidic acid, linolic acid, linolenic acid and isostearic acid. The examples of esters include butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, oleyl erucate, and neopentyl glycol didecanoate, and the examples of alcohols include oleyl alcohol, stearyl alcohol and lauryl alcohol.

In addition to the above compounds, nonionic surfactants, e.g., alkylene oxide, glycerol, glycidol or alkylphenolethylene oxide adducts; cationic surfactants, e.g., cyclic amines, ester amides, quaternary ammonium salts, hydantoin derivatives, heterocyclic compounds, or phosphonium or sulfonium; anionic surfactants containing an acidic group such as carboxylic acid, sulfonic acid, phosphoric acid, a sulfuric ester group or a phosphoric ester group; and ampholytic surfactants, e.g., amino acids, aminosulfonic acids, sulfuric or phosphoric esters of amino alcohols, and alkylbetain type surfactants can also be used.

The details of these surfactants are described in *Kaimen Kasseizai Binran* (*Handbook of Surfactants*), Sangyo Tosho Publishing Co., Ltd. These lubricants and antistatic agents need not be 100% pure and they may contain impurities such as isomers, non-reacted products, byproducts, decomposed products and oxides, in addition to the main components. However, the content of such impurities is preferably 30% by weight or less, and more preferably 10% by weight or less.

These lubricants and surfactants which are used in the present invention severally have different physical functions. The kinds, amounts and proportions of combinations of lubricants generating a synergistic effect should be determined optimally in accordance with the purpose. A nonmagnetic layer and a magnetic layer can separately contain different fatty acids each having a different melting point so as to prevent bleeding out of the fatty acids to the surface, or different esters each having a different boiling point, a different melting point or a different polarity so as to prevent bleeding out of the esters to the surface. Also, the amounts of surfactants are controlled so as to improve the coating stability, or the amount of a lubricant in an intermediate layer is made larger so as to improve the lubricating effect of the surface thereof. Examples are by no means limited thereto. In general, the total amount of lubricants is from 0.1 to 50% by weight based on the magnetic powder or the nonmagnetic powder, preferably from 2 to 25% by weight.

All or a part of the additives to be used in the present invention may be added to a magnetic coating solution or a nonmagnetic coating solution in any step of the preparation. For example, additives may be blended with a magnetic powder before a kneading step, may be added in a step of kneading a magnetic powder, a binder and a solvent, may be added in a dispersing step, may be added after a dispersing step, or may be added just before coating. According to purpose, there is a case of capable of attaining the object by coating all or a part of additives simultaneously with or successively after the coating of a magnetic layer. According to purpose, lubricants may be coated on the surface of a magnetic layer after calendering treatment or after completion of slitting.

Well-known organic solvents can be used in the present invention, e.g., organic solvents disclosed in JP-A-6-68453, can be used.

Layer Constitution and Form

It is necessary that the total thickness of the magnetic recording medium of the present invention have a prescribed ratio to the outside diameter of the disc.

A subbing layer may be provided between the support and the upper nonmagnetic or magnetic layer for adhesion improvement. The thickness of the subbing layer is preferably from 0.01 to 2 μm, and more preferably from 0.02 to 0.5 μm.

The magnetic recording medium according to the present invention is generally a medium in the form of a disc comprising magnetic layers provided on both surface sides of the support, but a magnetic layer may be provided on either one surface side. When the magnetic layer is provided on only one surface side of the support, a back coating layer may be provided on the surface side of the support opposite to the side having the magnetic layer for the purpose of static charge prevention and curling correction. The thickness of the back coating layer is preferably from 0.1 to 4 μm, and more preferably from 0.3 to 2.0 μm. Well-known subbing layers and back coating layers can be used.

The thickness of the magnetic layer of the disc of the present invention is optimized according to the specification of the head to be used and the recording signal zone, and the thickness is generally from 0.01 to 1.0 μm, and preferably from 0.03 to 0.2 μm. The magnetic layer may comprise two or more layers each having different magnetic characteristics and well-known multilayer magnetic layer constitutions can be applied to the present invention.

The thickness of the nonmagnetic layer which may be used as the subbing layer of the magnetic recording medium of the invention is generally from 0.2 to 5.0 μm, preferably from 0.5 to 3.0 μm, and more preferably from 1.0 to 2.5 μm. The subbing layer of the magnetic recording medium of the invention exhibits the effect so long as it is substantially nonmagnetic even if, or intentionally, it contains a small amount of magnetic powder as an impurity, which is as a matter of course regarded as essentially the same construction as in the present invention. The term "substantially nonmagnetic" means that the residual magnetic flux density of the subbing layer is 100 G or less, or the coercive force of the subbing layer is 100 Oe or less, preferably the residual magnetic flux density and the coercive force are zero.

Support

The nonmagnetic support for use in the invention is polyethylene naphthalate. The thickness of the support is not particularly restricted so long as the relationship of the outside diameter of the disc and the thickness of the disc is satisfied, but the thickness of the support is in general from 20 to 500 μm, and preferably from 25 to 200 μm.

If necessary, a lamination type support can be used to vary the surface roughnesses of the magnetic layer surface and the base surface. These supports may be previously subjected to surface treatments, such as corona discharge treatment, plasma treatment, adhesion assisting treatment, heat treatment, and dust removing treatment.

For attaining the object of the present invention, it is preferred to use supports having a central plane average surface roughness (Ra) measured by a surface roughness meter TOPO-3D (a product of WYKO Co., U.S.A.) by MIRAU method of 10 nm or less, and preferably 5 nm or less. It is preferred that these nonmagnetic supports not only have a small central plane average surface roughness but also they are free from coarse protrusions having a height of 200 nm or more.

The surface roughness configuration of nonmagnetic supports is freely controlled by the size and the amount of fillers added to the support. The examples of such fillers include acryl-based organic fine powders, as well as oxides or carbonates of Ca, Si and Ti. The support for use in the present invention preferably has a maximum height (Rmax) of 1 μm or less, a ten point average roughness (Rz) of 200 nm or less, a central plane peak height (Rp) of 200 nm or less, a central plane valley depth (Rv) of 200 nm or less, and an average wavelength (λa) of from 5 to 300 μm. For obtaining desired electromagnetic characteristics and durability, the surface protrusion distribution of the support can be controlled arbitrarily by fillers, e.g., the number of protrusions having sizes of from 0.01 to 1 μm can be controlled each within the range of from 0 to 2,000 per 0.1 mm$^2$.

The F-5 value of the nonmagnetic support for use in the present invention is preferably from 10 to 40 kg/mm$^2$ (from 98 to 392 N/m$^2$), the thermal shrinkage factor of the support at 105° C. for 30 minutes is preferably 0.5% or less, and more preferably 0.3% or less, and the thermal shrinkage factor at 80° C. for 30 minutes is preferably 0.3% or less, and more preferably 0.2% or less. The nonmagnetic support has an elastic modulus of from 500 to 1,400 kg/mm$^2$ (from 4,900 to 13,720 N/m$^2$), and preferably from 600 to 1,000 kg/mm$^2$ (from 5,880 to 9,800 N/m$^2$), a thermal expansion coefficient of from $10^{-4}$ to $10^{-8}$/° C., and preferably from $10^{-5}$ to $10^{-6}$/° C., and a humidity expansion coefficient of $10^{-4}$/RH% or less, and preferably $10^{-5}$/RH% or less. These thermal characteristics, dimensional characteristics and mechanical strength characteristics are preferably almost equal in every direction of in-plane of the support with difference of 10% or less.

Producing Method

Processes of preparing the magnetic coating solution of the magnetic recording medium of the present invention comprise at least a kneading step, a dispersing step and, optionally, blending steps to be carried out before and/or after the kneading and dispersing steps. Any of these steps may consist of two or more separate stages. Materials such as magnetic powder, nonmagnetic powder, a binder, a carbon black, an abrasive, an antistatic agent, a lubricant, a solvent, and the like for use in the present invention may be added at any step at any time. Each material may be added at two or more steps dividedly. For example, polyurethane can be added dividedly at a kneading step, a dispersing step, and a blending step for adjusting viscosity after dispersion.

For achieving the object of the present invention, the above steps can be performed partly with conventionally well-known techniques. Powerful kneading machines such as an open kneader, a continuous kneader, a pressure kneader or an extruder are preferably used in a kneading step. When a kneader is used, all or a part of the binder (preferably 30% or more of the total binders) is kneading-treated in the range of from 15 to 500 parts per 100 parts of the magnetic powder or nonmagnetic powder together with the magnetic powder or the nonmagnetic powder. Details of this kneading treatment are disclosed in JP-A-1-106338 and JP-A-1-79274. For the dispersion of a magnetic layer solution and a nonmagnetic layer solution, glass beads can be used but dispersing media having a high specific gravity are preferably used and zirconia beads, titania beads and steel beads are suitable for this purpose. An optimal particle size and packing density of these dispersing media should be selected. Well-known dispersing apparatus can be used in the present invention.

The following methods are preferably used in the present invention for coating a multilayer magnetic recording medium.

(1) A method of coating a lower layer in the first place by any of gravure coating, roll coating, blade coating, and extrusion coating apparatus, which are ordinarily used in the coating of a magnetic coating solution, and then coating an upper layer while the lower layer is still wet by means of the support-pressing type extrusion coating apparatus disclosed, e.g., in JP-B-1-46186, JP-A-60-238179 and JP-A-2-265672.

(2) A method of coating an upper layer and a lower layer almost simultaneously by using the coating head equipped with two slits for feeding coating solution as disclosed in JP-A-63-88080, JP-A-2-17971 and JP-A-2-265672.

(3) A method of coating an upper layer and a lower layer almost simultaneously by using the extrusion coating apparatus equipped with a backup roll as disclosed in JP-A-2-174965.

For preventing the deterioration of electromagnetic characteristics of the magnetic recording medium due to agglomeration of magnetic particles, it is preferred to impart shear to the coating solution in the coating head by the methods as disclosed in JP-A-62-95174 and JP-A-1-236968. With respect to the viscosity of a coating solution, it is preferred that the range of the numeric values disclosed in JP-A-3-8471 be satisfied.

For realizing the constitution of the present invention, a successive multilayer coating method in which a magnetic layer is coated on a lower layer after the lower layer has been coated and dried can of course be used.

In the case of a magnetic disc, isotropic orienting property can be sufficiently obtained in some cases without carrying out orientation using orientating apparatus, but it is preferred to use well-known random orientation apparatus, e.g., disposing cobalt magnets diagonally and alternately or applying an alternating current magnetic field by using a solenoid. Isotropic orientation is in general preferably in-plane two dimensional random orientation in the case of ferromagnetic metal fine powder, but it may be three dimensional random orientation having perpendicular factors. Hexagonal ferrites generally have an inclination for three dimensional random orientation of in-plane and in the perpendicular direction but it can be made in-plane two dimensional random orientation. Further, it is also possible to impart isotropic magnetic characteristics in the circumferential direction by perpendicular orientation by using well-known methods, e.g., by using different pole and counter position magnets. In particular, perpendicular orientation is preferred when the disc is used in high density recording. Circumferential orientation may be performed by using spin coating.

It is preferred that the drying position of a coated film can be controlled by controlling the temperature and the amount of drying air and the coating rate. Coating rate is preferably from 20 to 1,000 m/min. and the temperature of drying air is preferably 60° C. or more. Preliminary drying can be performed before entering a magnet zone.

Use of heat resisting plastic rolls, e.g., epoxy, polyimide, polyamide and polyimideamide, or metal rolls is effective for calendering treatment. Metal rolls are usable for the treatment particularly when magnetic layers are coated on both surface sides. Treatment temperature is preferably 50° C. or more, and more preferably 100° C. or more. Linear pressure is preferably 200 kg/cm (1,960 N/cm) or more, and more preferably 300 kg/cm (2,940 N/cm) or more.

Physical Properties

The saturation magnetic flux density of the magnetic layer of the magnetic recording medium of the present invention is from 2,000 to 6,000 G when ferromagnetic metal fine powders are used, and from 800 to 3,000 G when hexagonal ferrite powders are used.

The coercive force (Hc and Hr) is from 1,000 to 5,000 Oe (from 79.6 to 398 kA/m), and preferably from 1,500 to 3,000 oe (from 120 to 239 kA/m). Coercive force distribution is preferably narrow, and SFD and SFDr are preferably 0.6 or less. Squareness ratio is generally from 0.55 to 0.67 in the case of two dimensional random orientation, and preferably from 0.58 to 0.64, from 0.45 to 0.55 in the case of three dimensional random orientation, in the case of vertical orientation, generally 0.6 or more and preferably 0.7 or more in the perpendicular direction, and when diamagnetical correction is performed, squareness ratio is 0.7 or more, and preferably 0.8 or more. Orientation ratio of two dimensional random orientation and three dimensional random orientation is preferably 0.8 or more. In the case of two dimensional random orientation, squareness ratio, Br, Hc and Hr in the perpendicular direction are preferably from 0.1 to 0.5 times of those in the in-plane direction.

The friction coefficient of the magnetic recording medium of the present invention against a head in the range of temperature of −10° C. to 40° C. and humidity of 0% to 95% is 0.5 or less, and preferably 0.3 or less, the surface inherent resistivity of the magnetic surface is preferably from $10^4$ to $10^{12}$ ohm/sq, and the charge potential is preferably from −500 V to +500 V.

The elastic modulus at 0.5% elongation of the magnetic layer is preferably from 100 to 2,000 kg/mm$^2$ (from 980 to 19,600 N/mm$^2$) in every direction of in-plane, the breaking strength is preferably from 10 to 70 kg/mm$^2$ (from 98 to 686 N/mm$^2$), the elastic modulus of the magnetic recording medium is preferably from 100 to 1,500 kg/mm$^2$ (from 980 to 14,700 N/mm$^2$) in every direction of in-plane, the residual elongation is preferably 0.5% or less, and the thermal shrinkage factor at every temperature of 100° C. or less is preferably 1% or less, more preferably 0.5% or less, and most preferably 0.1% or less. The glass transition temperature of the magnetic layer (the maximum of loss elastic modulus of dynamic visco-elasticity measurement measured at 110 Hz) is preferably from 50° C. to 120° C., and that of the lower nonmagnetic layer is preferably from 0° C. to 100° C. The loss elastic modulus is preferably within the range of from $1 \times 10^8$ to $8 \times 10^9$ dyne/cm$^2$ (from $1 \times 10^3$ to $1 \times 10^4$ N/cm$^2$), and loss tangent is preferably 0.2 or less. When loss tangent is too large, adhesion failure is liable to occur.

These thermal and mechanical characteristics are preferably almost equal in every direction of in-plane of the medium with difference of not more than 10%.

The residual amount of the solvent in the magnetic layer is preferably 100 mg/m$^2$ or less, and more preferably 10 mg/m$^2$ or less. The void ratio of the coated layer is preferably 30% by volume or less with both of the nonmagnetic lower layer and the magnetic layer, and more preferably 20% by volume or less. The void ratio is preferably smaller for obtaining high output but in some cases a specific value should be preferably secured depending upon purposes. For example, in a medium in the form of a disc which is repeatedly used, large void ratio contributes to good running durability in many cases.

The magnetic layer has a central plane average surface roughness (Ra) measured by a surface roughness meter TOPO-3D (a product of WYKO Co., Ltd., U.S.A.) by MIRAU method of preferably 5 nm or less, more preferably 3 nm or less, and particularly preferably 2 nm or less.

When the central plane average surface roughness of the surface of a magnetic layer is higher than 5 nm, the contact of a head with a disc on micro level becomes uneven and stable head touch cannot be obtained even with a disc having such rigidity, so that unsuitable.

The magnetic layer for use in the present invention preferably has a maximum height (Rmax) of 200 nm or less, a ten point average roughness (Rz) of 80 nm or less, a central plane peak height (Rp) of 80 nm or less, a central plane valley depth (Rv) of 80 nm or less, and an average wavelength (λa) of from 5 μm to 300 μm. It is preferred to optimize the friction coefficient by arbitrarily setting the surface protrusions of the magnetic layer of sizes of from 0.01 μm to 1 μm within the range of the number of from 0 to 2,000. The surface protrusions can be easily controlled by controlling the surface property by fillers in the support, the particle sizes and the amount of the magnetic powder added to the magnetic layer, or by the surface configuration of the rolls in calender treatment.

When the magnetic recording medium of the present invention comprises a nonmagnetic layer and a magnetic layer, it can be easily presumed that these physical properties can be varied according to purposes in the nonmagnetic layer and the magnetic layer. For example, the elastic modulus of the magnetic layer is made higher to improve running durability and at the same time the elastic modulus of the nonmagnetic layer is made lower than that of the magnetic layer to improve the head touching of the magnetic recording medium.

EXAMPLE

The present invention will be illustrated in detail with reference to examples below, but these are not to be construed as limiting the invention. In examples "parts" means "parts by weight".

Preparation of Coating Solution

| Magnetic coating solution X: | |
| --- | --- |
| Barium ferrite magnetic powder | 100 parts |
| Composition in molar ratio based on Ba: | |
| Fe, 9.10, Co, 0.20, Zn, 0.77 | |
| Hc: 2,500 Oe | |
| Specific surface area: 50 m$^2$/g | |
| $\sigma_s$: 52 emu/g | |
| Tabular diameter: 25 nm | |
| Tabular ratio: 3.0 | |
| UR 8200 (manufactured by Toyobo Co., Ltd.) | 12 parts |
| MD 80 (manufactured by Tomei Daiya K.K.) | 1 part |
| HIT60 (manufactured by Sumitomo Chemical Co., Ltd.) | 4 parts |
| #50 (manufactured by Asahi Carbon Co., Ltd.) | 3 parts |
| Butyl stearate | 2 parts |
| Butoxyethyl stearate | 2 parts |
| Isohexadecyl stearate | 4 parts |
| Stearic acid | 2 parts |
| Methyl ethyl ketone | 160 parts |
| Cyclohexanone | 160 parts |

| Magnetic coating solution Y: | |
| --- | --- |
| Ferromagnetic metal fine powder | 100 parts |
| Composition: Fe 70%, Co 30% | |
| Hc: 2,500 Oe | |
| Specific surface area (S$_{BET}$): 70 m$^2$/g | |
| $\sigma_s$: 110 emu/g | |
| Crystallite size: 110 nm | |
| Long axis length: 0.045 μm | |
| Acicular ratio: 4 | |
| Sintering inhibitor (i.e., compound existing on the surface and acting as sintering inhibitor): | |
| Al compound (Al/Fe, atomic ratio: 8%) | |
| Y compound (Y/Fe, atomic ratio: 8%) | |
| UR 8200 (manufactured by Toyobo Co., Ltd.) | 15 parts |
| MD 80 (manufactured by Tomei Daiya K.K.) | 2 parts |
| HIT60 (manufactured by Sumitomo Chemical Co., Ltd.) | 5 parts |
| #50 (manufactured by Asahi Carbon Co., Ltd.) | 5 parts |
| Butyl stearate | 2 parts |
| Butoxyethyl stearate | 2 parts |
| Isohexadecyl stearate | 4 parts |
| Stearic acid | 2 parts |
| Methyl ethyl ketone | 180 parts |
| Cyclohexanone | 180 parts |

| Nonmagnetic coating solution Z: | |
| --- | --- |
| Nonmagnetic powder, α-Fe$_2$O$_3$, hematite | 80 parts |
| Long axis length: 0.06 μm | |
| Specific surface area (S$_{BET}$): 70 m$^2$/g | |
| pH: 9 | |
| Surface-covering compound: Al$_2$O$_3$, 8% by weight | |
| Carbon black | 15 parts |
| CONDUCTEX SC-U (manufactured by Columbia Carbon Co., Ltd.) | |
| Polyurethane resin | 18 parts |
| UR 8200 (manufactured by Toyobo Co., Ltd.) | |
| Phenylphosphonic acid | 2 parts |
| Butyl stearate | 3 parts |
| Butoxyethyl stearate | 3 parts |
| Isohexadecyl stearate | 6 parts |
| Stearic acid | 3 parts |
| Methyl ethyl ketone/cyclohexanone (8/2 mixed solvent) | 250 parts |

Examples and Comparative Examples

The components of each of the above three coating solutions were blended by a kneader and dispersed in a sand mill. Polyisocyanate was added to each resulting dispersion solution, that is, 10 parts to the coating solution for forming a nonmagnetic layer, and 10 parts to the coating solution for forming a magnetic layer. Further, 40 parts of methyl ethyl ketone was added to each solution, and each solution was filtered through a filter having an average pore diameter of 1 μm, to thereby obtain coating solutions for forming a nonmagnetic layer and magnetic layers.

The obtained nonmagnetic coating solution Z was coated on both surfaces of a polyethylene naphthalate support having a thickness of 71 μm and a central plane average surface roughness of 4 nm in a dry coating thickness of 1.92 μm, and dried.

Magnetic layer coating solution X was coated on both nonmagnetic layers in a dry thickness of 0.08 μm. After drying, the coated layers were subjected to calendering treatment with calenders of 7 stages at 90° C. at linear pressure of 300 kg/cm. The obtained web was punched to a disc having an outside diameter of 45 mm and an inside diameter of 5 mm, the disc was subjected to surface treatment,by abrasives, and encased in a cartridge. The obtained disc was named Sample A-2.

Samples B-1, A-1, A-3 and B-2 were prepared in the same manner as in the preparation of A-2 except that the thickness of the polyethylene naphthalate support used in Sample A-2 (71 μm, hereinafter referred to as "the base thickness") was changed to 28 μm, 53 μm, 146 μm and 196 μm respectively.

Samples B-3, A-4, A-5, A-6, A-7 and B-4 were prepared in the same manner as in the preparation of A-2 except that the base thickness was changed to 16 μm, 27 μm, 34 μm, 53 μm, 79 μm and 116 μm, and each web was punched to a disc having an outside diameter of 25 mm and an inside diameter of 3 mm.

Samples B-5, A-8, A-9 and A-10 were prepared in the same manner as in the preparation of A-2 except that the base thickness was changed to 71 μm, 116 μm, 196 μm and 296 μm, and each web was punched to a disc having an outside diameter of 90 mm and an inside diameter of 20 mm.

Samples B-6, A-11 and A-12 were prepared in the same manner as in the preparation of A-2 except that polyethylene naphthalate supports having a central plane average surface roughness of respectively 18 nm, 10 nm and 6 nm were used.

Samples A-13 and B-7 were prepared in the same manner as in the preparation of A-2 except that polyethylene naphthalate supports each having different thickness variation were used.

Samples B-8, A-14, A-15, A-16 and B-9 were prepared in the same manner as in the preparation of Samples B-1, A-1, A-2, A-3 and B-2 except that the magnetic coating solution Y was used, and the coated magnetic and nonmagnetic layers were subjected to random orientation while both layer were still wet by passing through an alternating current magnetic field generator having two magnetic field intensities of frequency of 50 Hz and magnetic field intensity of 250 Gauss, and frequency of 50 Hz and magnetic field intensity of 120 Gauss, and then drying.

The envelope reproducing waveform, output reduction, surface roughness and thickness variation of Samples A-1 to A-16 (samples of the invention) and Samples B-1 to B-9 (comparative samples) were observed. The results obtained are shown in Table 1 below.

Method of Evaluation

Envelope Waveform

Each disc was rotated at 5,000 rpm, and signals the recording density of which became 90 kfci at the radius position of the half of the outside diameter were recorded with an MIG head and reproduced with an AMR head. The envelope reproducing waveform was observed with an oscilloscope, and the fluctuation of waveform due to thermal asperity and head touch failure was evaluated according to the criteria as shown below.

Fluctuation was conspicuous: x

Fluctuation was observed: —

Fluctuation was observed a little: o

Fluctuation was not observed at all: ○

Output Reduction

Each disc was run at 23° C. 50% RH in a random seek mode. The reproduction signal output of each sample was monitored for 120 hours, and the output reduction from the initial output was measured.

When the head of the sample which showed output reduction by 5 dB or more was observed, apparent abrasion of the MR element was observed.

Surface Roughness

Surface roughness (Ra) of each support and disc was obtained by measuring the area of about 250 μm×250 μm by TOPO-3D (a product of WYKO Co., Ltd., U.S.A.) by MIRAU method.

The wavelength of measurement was about 650 nm and spherical compensation and cylindrical compensation were applied, and measurement was performed by using a light interference type non-contact surface roughness meter.

Thickness Variation

The thickness variation was obtained by measuring the thickness of the whole surface of each disc with the intervals of about 5 mm by a digital thickness meter, Minicom (manufactured by Tokyo Seimitsu Sha Co., Ltd.), and the standard deviation σ was taken as the thickness variation rate.

TABLE 1

| | Disc | | | | | | Characteristics | |
| --- | --- | --- | --- | --- | --- | --- | --- | --- |
| Sample No. | Magnetic Coating Solution | Thickness X (μm) | Outside Diameter Y (mm) | Y/X | Surface Roughness (nm) | Thickness Variation Rate (%) | Envelope Waveform | Output Reduction (dB) |
| B-1 | X | 32 | 45 | 1.41 | 1.6 | 0.3 | — | −8.8 |
| A-1 | X | 57 | 45 | 0.79 | 1.6 | 0.4 | ◎ | −0.2 |
| A-2 | X | 75 | 45 | 0.60 | 1.6 | 0.5 | ◎ | −0.2 |
| A-3 | X | 150 | 45 | 0.30 | 1.6 | 0.6 | o | −0.4 |
| B-2 | X | 200 | 45 | 0.23 | 1.6 | 0.7 | x | −0.3 |
| B-3 | X | 20 | 25 | 1.25 | 1.6 | 0.3 | — | −10 or more |
| A-4 | X | 32 | 25 | 0.78 | 1.6 | 0.3 | ◎ | −0.7 |
| A-5 | X | 38 | 25 | 0.66 | 1.6 | 0.4 | ◎ | −0.3 |
| A-6 | X | 57 | 25 | 0.44 | 1.6 | 0.5 | ◎ | −0.3 |
| A-7 | X | 83 | 25 | 0.31 | 1.6 | 0.5 | o | −0.1 |
| B-4 | X | 120 | 25 | 0.21 | 1.6 | 0.6 | x | −0.3 |
| B-5 | X | 75 | 90 | 1.20 | 1.6 | 0.4 | x | −8.3 |
| A-8 | X | 120 | 90 | 0.75 | 1.6 | 0.5 | ◎ | −0.5 |
| A-9 | X | 200 | 90 | 0.45 | 1.6 | 0.6 | ◎ | −0.3 |
| A-10 | X | 300 | 90 | 0.30 | 1.6 | 0.7 | o | −0.2 |
| B-6 | X | 75 | 45 | 0.60 | 7.3 | 0.5 | x | −5.1 |
| A-11 | X | 75 | 45 | 0.60 | 5.0 | 0.5 | o | −1.2 |
| A-12 | X | 75 | 45 | 0.60 | 2.4 | 0.5 | ◎ | −1.0 |
| A-13 | X | 75 | 45 | 0.60 | 1.6 | 3.0 | o | −1.3 |
| B-7 | X | 75 | 45 | 0.60 | 1.6 | 4.2 | — | −5.6 |
| B-8 | Y | 32 | 45 | 1.41 | 1.6 | 0.4 | — | −9.2 |
| A-14 | Y | 57 | 45 | 0.79 | 1.9 | 0.5 | ◎ | −0.4 |
| A-15 | Y | 75 | 45 | 0.60 | 1.9 | 0.6 | ◎ | −0.1 |
| A-16 | Y | 150 | 45 | 0.30 | 1.9 | 0.5 | o | −0.4 |
| B-9 | Y | 200 | 45 | 0.23 | 1.9 | 0.7 | x | −0.4 |

Note:
A-1 to A-16: Samples of the invention
B-1 to B-9: Comparative samples

Comparison of the Invention and Comparative Samples

It can be seen from the above results that the magnetic recording media according to the present invention are stable in the envelope reproducing waveform even when reproduction is carried out with an MR head. Further, satisfactory results can be obtained by the present invention also in long term running with being accompanied by little output reduction due to head abrasion. On the other hand, each magnetic recording medium in the comparative example was unsatisfactory in some result.

As described above, the present invention can provide a magnetic recording medium in the form of a disc which is markedly improved in electromagnetic characteristics, in particular, high density recording characteristics, and can exhibit the excellent characteristics in every size of a disc, in particular, can exhibit excellent high density recording characteristics in the reproduction by an MR head.

While the invention has been described in detail and with reference to specific examples thereof, it will be apparent to one skilled in the art that various changes and modifications can be made therein without departing from the spirit and scope thereof.

This application is based on Japanese Patent application JP 2002-65353, filed Mar. 11, 2002, the entire content of which is hereby incorporated by reference, the same as if set forth at length.

What is claimed is:

1. A magnetic recording medium in the form of a disc comprising:

a polyethylene naphthalate support; and a magnetic layer comprising a binder and at least one of a ferromagnetic metal powder and a ferromagnetic hexagonal ferrite powder dispersed in the binder, wherein a central plane average surface roughness of the magnetic layer is 5 nm or less, a thickness variation rate of the disc is 3% or less, and a total thickness of the disc, X $\mu$m, and an outside diameter of the disc, Y mm, satisfy a relationship of $0.3 \leq Y/X \leq 0.8$.

2. The magnetic recording medium according to claim 1, further comprising a subbing layer provided between the support and the magnetic layer, wherein the subbing layer is substantially nonmagnetic.

3. The magnetic recording medium according to claim 1, wherein the central plane average surface roughness of the magnetic layer is 3 nm or less.

4. The magnetic recording medium according to claim 2, wherein the central plane average surface roughness of the magnetic layer is 3 nm or less.

5. The magnetic recording medium according to claim 1, wherein the central plane average surface roughness of the magnetic layer is 2 nm or less.

6. The magnetic recording medium according to claim 1, wherein the thickness variation rate is 1% or less.

7. The magnetic recording medium according to claim 1, wherein the thickness variation rate is 0.5% or less.

8. The magnetic recording medium according to claim 1, wherein the relationship is $0.4 \leq Y/X \leq 0.7$.

9. The magnetic recording medium according to claim 1, wherein the relationship is $0.5 \leq Y/X \leq 0.7$.

10. The magnetic recording medium in the form of a disc according to claim 1, wherein reproduction is performed by a magneto-resistance head.

* * * * *